United States Patent [19]
Neubauer

[11] 3,732,541

[45] May 8, 1973

[54] METHOD AND APPARATUS FOR EVALUATING REPETITIVELY TRANSMITTED SIGNALS

[75] Inventor: Gunter Neubauer, Konstanz, Germany

[73] Assignee: Licentia Patent-Verwaltungs-G.m.b.H., Frankfurt am Main, Germany

[22] Filed: Apr. 26, 1971

[21] Appl. No.: 137,144

[30] Foreign Application Priority Data

Apr. 27, 1970 Germany....................P 20 20 413.1
Oct. 22, 1970 Germany....................P 20 51 848.3

[52] U.S. Cl........................................340/146.1 BA
[51] Int. Cl........................G06f 11/00, G08c 25/00
[58] Field of Search ..........................340/146.1 BA; 178/23 A

[56] References Cited

UNITED STATES PATENTS

| | | | |
|---|---|---|---|
| 2,997,540 | 8/1961 | Ertman et al. | 340/146.1 |
| 3,256,514 | 6/1966 | Leonard et al. | 340/146.1 |
| 3,531,769 | 9/1970 | Montgomery et al. | 340/146.1 |
| 3,612,843 | 10/1971 | Aptroot-Soloway | 340/146.1 |

*Primary Examiner*—Charles E. Atkinson
*Attorney*—Spencer & Kaye

[57] ABSTRACT

A method and apparatus for correcting or at least detecting, at a receiver, errors in a sequence of data words each sent together with an associated parity test signal over a transmission channel between a transmitter and the receiver, the error correction or at least detection being performed by subjecting each received word to a parity test and delivering the received words, together with a signal indicating the result of their individual parity tests, into a memory, sending the words and their associated parity test signals a second time over the transmission channel, subjecting the words received during the second transmission to a parity test and comparing each word with the word received during the first transmission, replacing, in the memory, a word received during the first transmission by the word received during the second transmission only when the word received during the second transmission does not have a parity error, causing the words to be sent over the transmission channel a third time, subjecting the words received during the third transmission to a parity test, and replacing a word then in the memory with the word received during the third transmission only when the versions received during the first and second transmissions differed from one another and the word received during the third transmission has correct parity.

8 Claims, 2 Drawing Figures

Inventor:
Günter Neubauer

BY Spencer & Kaye
ATTORNEYS.

Inventor:
Günter Neubauer

BY Spencer & Kaye
ATTORNEYS

METHOD AND APPARATUS FOR EVALUATING REPETITIVELY TRANSMITTED SIGNALS

BACKGROUND OF THE INVENTION

The present invention relates to a method and apparatus for evaluating signals transmitted repetitively to a receiver for the purpose of error recognition and as possible error correction. The invention is particularly suited for use with data displays operated via long lines, particularly telephone lines, where the displays have their own image memory.

In displays, the present invention produces, for a relatively low additional expenditure and utilizing the usually available image memory for the image repetition, a good probability of an accurate rendition of the signals which are usually received over lines subject to interference, particularly telephone lines, using known testing methods, such as for example, a parity test or comparison test.

It is known to subject coded signals, after arrival at a receiver, to a signal parity test. Parity generally means, unless otherwise specified, having an odd (or even) number of digits, or bits, of a certain value. At the transmitting end a parity check digit, or bit, is added to the signal code word to make the number of 1's in the signal code word and the check bit odd or even. At the receiving end, the group composed of the code word and a parity check bit is checked to determine whether or not this parity remained intact.

It is also known to subject a signal block, i.e., a sequence of certain coded signals which are considered to belong together in a suitable manner and which are transmitted in succession, to a block length parity test. The previously mentioned signal parity test is often also called the transverse parity test to distinguish it from this block length parity test. To test the block length parity, the signal block receives a block parity test signal whose individual digits indicate the parity of the corresponding digits of all preceding signals in the block, i.e., whether the total number of bits of a certain value is odd or even, or supplement the block signals to create a predetermined parity. At the receiver it is determined whether or not the received block has the proper parity.

It is also known to perform both types of parity tests in the receiver. It is further known to transmit a signal block repetitively in order to detect, and if possible correct, errors contained therein, particularly by a comparison of the signals received during two successive transmissions.

The above-mentioned methods are generally known in the art.

SUMMARY OF THE INVENTION

It is a primary object of the present invention to improve and simplify the elimination of errors in systems employing such error detection techniques.

A further object of the invention is to eliminate transient, i.e., non-recurring, errors in the transmission of data over a transmission channel.

According to the present invention, during a first transmission the signals are subjected to a known parity test at the receiving end, are stored there and signals which lack the proper parity are identified, whereupon a second transmission takes place in which all signals are compared, in a known manner, with the stored signals of the first transmission, the stored signals of the first transmission are replaced by those of the second transmission, except for the signals of the second transmission which lack the proper parity, and those signals then contained in the memory for which the two transmissions did not produce identical results are then identified.

According to a further feature of the present invention, there is effected a third transmission during which the previous identification of a signal in the memory effects the replacement of that signal by the version of the signal received during the third transmission, except when the latter lacks the proper parity.

It is preferable to provide the signals which lacked proper parity in the first transmission, on the one hand, and those which do not coincide during the first and second transmission, on the other hand, with different identifications, particularly when the method of the invention is applied to an image memory with a display connected thereto as the receiver, in such a manner that signals stored in the memory during the first transmission and lacking proper parity, are displayed in the form of a special error signal and stored signals of the second transmission which do not coincide with their counterpart from the first transmission are provided with a special identifying bit which causes the display of the signal to deviate from its normal shape or brightness.

In the preferred embodiment of a device according to the present invention, the receiver is provided with: memory sections for storing the signal words to be recorded, a receiving register for receiving signal words including the parity bit, a parity testing device, an identity testing device connectable to the receiving register and to a selectable signal memory section and activated by a transmission counter for introducing an identification bit into a selected signal memory section, and a transfer gate circuit for transferring the contents of the receiving register to a selected signal memory section, the gate being enabled for passage via a decision circuit in dependence on the state of the transmission counter in conjunction with the signal from the parity testing device, and possibly the identification bits.

A modification of the method of the present invention involves a block parity test with an evaluation of the result for the eventual suppression of the second or third transmission.

The receiver of apparatus according to the present invention for performing this modified method contains, in addition to a unit for subjecting the individual signals during a first transmission to a known parity test, a member for storing the signals and a device for identifying the signals which do not have proper parity. The receiver further includes a circuit for comparing all signals in a known manner, during a second transmission, with signal parity testing, with the stored signals from the first transmission, in order to replace the signals from the first transmission with those from the second transmission, except for those signals which had an improper parity during the second transmission and to identify those signals contained in the memory for which the two transmissions did not coincide. The receiver also has circuitry for replacing, during a third transmission with signal parity test, the previously identified signals which were stored in the memory with their counterparts received during the third transmission, except when the latter lacks proper parity. Further devices are provided to form and evaluate block length parity signals in a known manner and to feed the resulting signal, together with the signals from the signal parity testing device, to a device which automatically or indirectly causes the initiation of a second or third transmission only when at least one of these evaluation signals indicates the presence of an error.

DESCRIPTION OF THE PREFERRED EMBODIMENTS

Before proceeding with the detailed description, it should be noted that an automatic sequence of the transmissions may be provided or each transmission may be individually initiated. When the receiver is a display device, the observer can decide whether the current display is satisfactory, particularly whether it obviously does not contain any errors or only such errors which are insignificant in view of the available context or for other reasons, and it may then be advisable to actuate the second or third transmission only when required by the operator.

Figure 1:
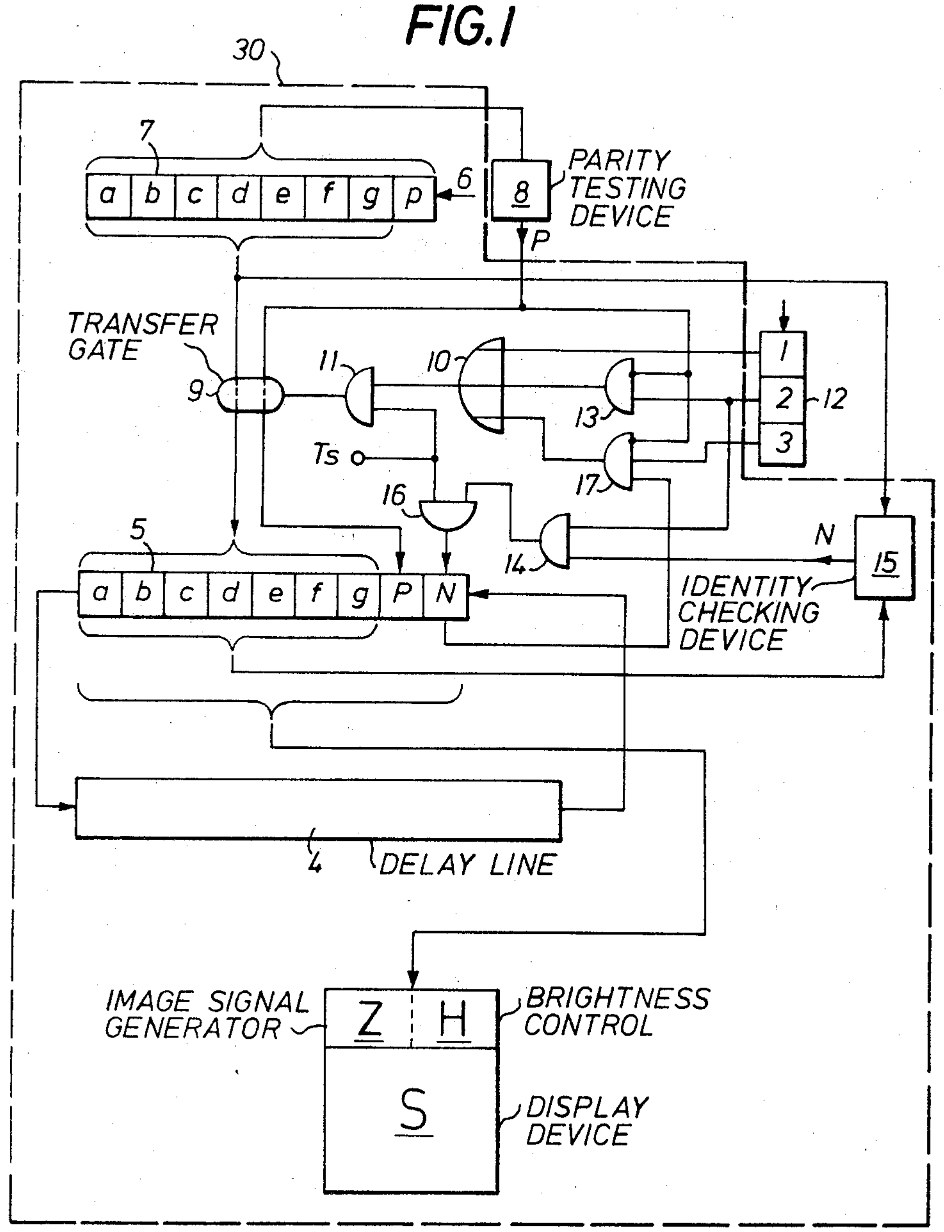
FIG. 1 is a block circuit diagram of a preferred embodiment of the invention for testing individual words.

In the system of FIG. 1, there is provided a delay line 4 for a circulating memory which serves as a known manner as the display repetition memory for a connected display S in the form of a cathode-ray picture tube, it being assumed that this tube operates on the principle of television, i.e., with a line-by-line production of picture dots creating the image to be displayed, the cathode ray being controlled by a signal generator Z. Synchronized with the television display timing pattern, the circulating memory delivers multiple bit signals - bits *a, b, c, d, e, f, g*, P, N — from a register 5 to signal generator Z and a brightness control H of the display, which signals determine which character is to be displayed and in which manner. Register 5 is disposed in the feedback path between the output and the input of delay line 4 and holds in succession the contents of the memory sections provided for each character so that they can be addressed by timed controls.

Systems of this kind are described in the book "Computer Data Displays" by S. Davis, Prentice Hall Inc. Englewood Cliffs, N.J., 1969; special reference is made to pages 5, 6 and 158 – 160.

The sequence of signal words to be stored originates, for example, from a computer and arrive in series via long line 6, the words being fed in series into a receiving register 7 having locations for the word bits *a, b, c, d, e, f, g, p*, where p is the parity bit. A parity testing device 8 of any suitable known type is connected to the receiving register 7 and a binary signal P = 1, indicating lack of parity, or P = 0, indicating parity, is emitted at its output. Signal P has a value of 1, for example when errors have occured in an odd number of bits during the transmission, while as is known, a simple length parity test does not indicate the occurrence of errors in an even number of bits. "Parity error" or "lack of parity" is hereinafter always intended to mean the first-mentioned case which can be detected by the parity testing device 8.

Bits *a–g* of each signal word containing the transmitted information, when completely contained in the receiving register, can be transferred, during a storing interval T*s* which is determined by the memory section, into register 5, together with the output signal of the parity testing device 8, via a transfer gate circuit 9. Circuit 9 is enabled for passage of a word by an enabling circuit including an OR gate 10 and an AND gate 11 connected to the gate lead of circuit 9, this transfer gate circuit being enabled only during the storing interval T*s*.

The enabling, or unblocking, of transfer gate circuit 9 is controlled by a transmission counter 12, whose counter positions 1, 2, 3, indicate a first, second and third transmission respectively, of the same sequence of signal words via line 6. The counter position 1 produces an output during the first transmission, and this is fed directly to OR gate 10 to continuously activate its output so that the bits *a–g* of each received information word together with the parity testing result are transferred into register 5 at the storing time T*s* and thus reach the associated section of the circulating memory.

It should be noted that with the transfer of a word into a memory section, this word always replaces the word previously contained in this section. The counter position 2 produces an output during the second transmission and this activates the output of an ANDNOT gate 13 and thus the output of the connected OR gate 10 only when the parity testing device 8 connected to the negated input of gate 13 produces a 0 indicating that the word received in receiving register 7 exhibits no parity errors. Words containing parity errors are thus not fed into the circulating memory during the second transmission.

Moreover, during a second transmission, the output signal of counter position 2 of the transmission counter 12 enables an AND gate 14, while an identity checking device 15, which may be a known multistage digital comparator, compares the contents of bit locations *a–g* of each word stored in receiving register 7 with the corresponding bit locations of register 5. Its binary output signal N is fed at time Ts via AND gate 14 and a connected AND gate 16 to the bit location N of register 5 which is provided for this purpose. A certain bit value, e.g., N = 1, at the corresponding location of a memory section thus indicates that the word stored in this section during the first transmission was not identical with the corresponding word of the second transmission. Conversely, if N = 0, the word is identical for the two transmissions.

A bit value of 1 contained in bit location P of a memory section, which bit value indicates a parity error, causes the signal generator Z to produce a special error symbol at the time or location of display for the word of this section on the picture screen. A bit value of 1 contained in the bit location N of a memory section, which value indicates noncoincidence between the first and second transmissions of a word, activates a brightness control during the display of the associated stored word to cause it to appear in a manner which is different from the normal display manner, e.g., flickering.

If a third transmission is initiated via line 6, the transmission counter 12 emits an output from its counter position 3. This output will activate the output of an ANDNOT gate 17 connected ahead of OR gate 10, and thus also the output of OR gate 10, when, and only when, a bit value of 1 is fed from bit location N of register 5 to the second input of the gate 17, which bit value indicates noncoincidence between the first and second transmissions, and the signal from the parity testing device 8 applied to a third input of gate 17 indicates that the word stored in receiving register 7 during this third transmission has no parity error. If these conditions are present at time $T_s$, the word from the third transmission is transferred from register 7 into register 5, i.e., into the associated memory section of the circulating memory.

Disturbances which occur, particularly during the transmission over telephone lines, are evident, as experience has shown, as more or less short "error bursts". In the times therebetween, the occurrence of errors is substantially less frequent than the average for the particular transmission line. If disturbances thus appear in an image produced on display S, the probability is great that during the subsequent second transmission the error probability is low. The probability that the same words are interfered with in two consecutive transmissions is very low. It can thus be taken for granted with a high probability that words into which errors were introduced during the first transmission are replaced after the second transmission by the correct words, and that also the remaining words are accurate since words with parity errors are not accepted during the second transmission.

If an even number of bits was falsified in a word during the first received transmission or if an even number of bits is falsified in the version of the word transmitted during the second transmission, this will almost definitely be detected by the identity comparison during the second transmission and will be indicated on the screen.

Finally, the word transmitted during the third transmission is placed in register 5, except when it lacks parity, instead of the previously stored word which exhibited differences between the first and second transmission. In this case, the word received during the third transmission and placed in register 5 will duplicate with a high probability the word received during the first or second transmission and thus decide with considerable accuracy which of the two was the correct one.

The relationships resulting in the above described operation, particularly with the use of the above-described apparatus, are summarized in the following table.

In the six designated columns forming the body of the table following the numerical identification column, the numbers 1, 2, 3, indicate a first, second and third transmission, respectively, *a* indicates a first word, *b* a word different from *a*, *c* a word different from *a* and *b*, *p* a received word containing a parity error and (*d*) designates the occurrence of a difference indication due to noncoincidence between the word received during the second transmission and that of the first transmission. In the first three, there are indicated words received during the first, second and third transmissions, respectively. In the second three columns are indicated the words contained in the circulating memory after the first, second and third transmissions, respectively. Each numbered row relates to a different example.

| | Word Received | | | Word Stored | | |
|---|---|---|---|---|---|---|
| | First Trans-mission | Second Trans-mission | Third Trans-mission | After First Trans-mission | After Second Trans-mission | After Third Trans-mission |
| 1 | *a*1 | *a*2 | *a*3 | *a*1 | *a*2 | *a*2 |
| 2 | *a*1 | *b*2 | *a*3 | *a*1 | *b*2(*d*) | *a*3 |
| 3 | *a*1 | *b*2 | *b*3 | *a*1 | *b*2(*d*) | *b*3 |
| 4 | *b*1 | *a*2 | *a*3 | *b*1 | *a*2(*d*) | *a*3 |
| 5 | *p*1 | *a*2 | *a*3 | *p*1 | *a*2(*d*) | *a*3 |
| 6 | *p* 1 | *p*2 | *a*3 | *p*1 | *p*1(*d*) | *a*3 |
| 7 | *p*1 | *a*2 | *p*3 | *p*1 | *a*2(*d*) | *a*2 |
| 8 | *a*1 | *a*2 | *p*3 | *a*1 | *a*1 | *a*2 |
| 9 | *a*1 | *p*2 | *a*3 | *a*1 | *a*1(*d*) | *a*3 |
| 10 | *a*1 | *p*2 | *p*3 | *a*1 | *a*1(*d*) | *a*1 |
| 11 | *p*1 | *p*2 | *p*3 | *p*1 | *p*1(*d*) | *p*1 |
| 12 | *p*1 | *a*2 | *b*3 | *p*1 | *a*2(*d*) | *b*3 |
| 13 | *a*1 | *b*2 | *p*3 | *a*1 | *b*2(*d*) | *b*2 |
| 14 | *a*1 | *p*2 | *b*3 | *a*1 | *a*1(*d*) | *b*3 |
| 15 | *a*1 | *b*2 | *c*3 | *a*1 | *b*2(*d*) | *c*3 |

This table shows that the method of the invention brings the following results after three transmissions:

If two or three of the transmissions supply identical words without parity errors, they are evaluated as an accurate word. Examples of this are shown in rows 1, 2, 3, 4, 5, 8 and 9. If the words received during two of the three transmissions have errors, the one word for which no such error is indicated is selected, as shown in the examples set forth in rows 6, 7, and 10. When three different words are received during the three transmissions, that of the third transmission is selected if it does not lack parity, as shown in the examples of rows 12, 14 and 15. If it does lack parity, the word of the second transmission applies, as in the example of row 13. Only words which appear with parity errors in all three transmissions, as in the example of row 11, remain questionable and are identified by an error signal.

Apparatus can also be provided for performing the modified method of the invention in which it is assumed that the words are transmitted in blocks, this apparatus being provided in the receiver in addition to the above-mentioned devices as far as framed by the broken line 30 in FIG. 7, to further increase the error detection probability and to reduce the average number of transmissions required.

Figure 2:
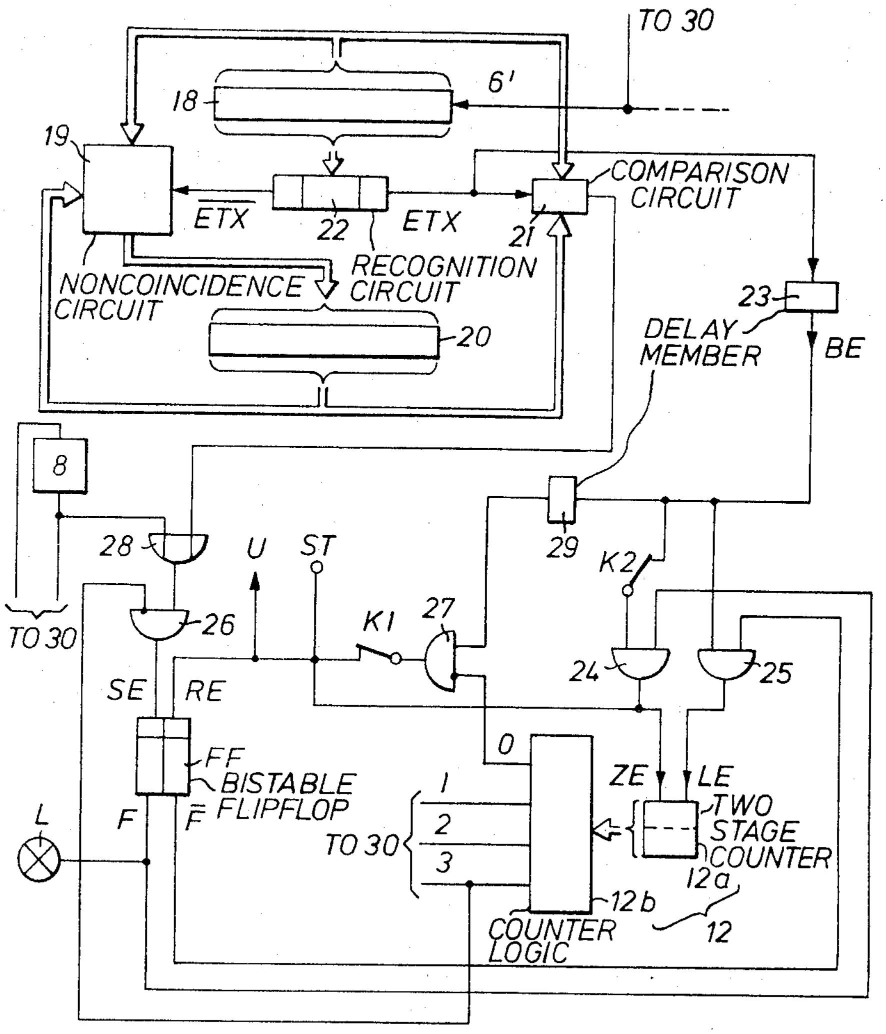
FIG. 2 is a block circuit diagram of a preferred embodiment of the invention capable of testing block length signals.

FIG. 2 shows one embodiment of such apparatus including a shift register 18 which also receives the transmitted signal words, but without the additional parity bit, via an input 6'. The locations of this shift register are connected to a noncoincidence circuit 19 as are the locations of a register 20.

The noncoincidence circuit 19 is so designed that it performs a noncoincidence comparison of the individual bit values in the shift register 18, after each reception of a complete word, with the bit values of the corresponding locations in register 20 and reads the result into register 20, this mode of operation corresponding to that performed by a set of modulo-2 adders. The locations of the shift register 18 and those of register 20 are also connected to a comparison circuit 21.

A recognition circuit 22 is connected to shift register 18, which recognition circuit responds to a block end word ETX to activate the comparison circuit 21 via line $\overline{ETX}$ and to block the noncoincidence circuit 19 via line ETX, the latter having a slight delay so that word ETX is processed by the noncoincidence circuit 19, i.e., compared with the then current contents of register 20, but not by the comparison circuit 21. Directly after receipt of signal ETX, the block length parity signal formed in the transmitter is received, i.e., written into shift register 18, and compared with the current contents of register 20 by comparison circuit 21. When the signals in registers 18 and 20 do not coincide, a block length parity error is present, in which case comparison circuit 21 emits a signal having a binary value of 1.

The pulse formed in recognition circuit 22 upon recognition of the block end word ETX is fed to a delay member 23 from whose output it is transmitted as a block end pulse BE after evaluation of the block length parity signal. Pulse BE is applied directly to one input of each of AND gates 24 and 25 and, after a delay produced by delay member 29, to the direct input of ANDNOT gate 27.

Counter 12 of FIG. 1 is shown in greater detail in FIG. 2 to consist of a two-stage binary counter 12*a* to which counting pulses are fed via line ZE and erase pulses via line LE, and a counter logic 12*b* whose counter location outputs 1, 2 and 3 are the outputs of locations 1, 2 and 3 of counter 12 of FIG. 1 and having an additional output 0 which provides a signal indicating the counter zero state.

The circuit of FIG. 2 enables the required block repetitions to be automatically initiated when switches K1 and K2 are closed, and permits such repetitions to be individually initiated selectively when switches K1 and K2 are open. An error indicator lamp L indicates, in the latter case, the need for a repetition.

The lamp L is connected to the error-indicating output F of a bistable flipflop circuit FF, which is set by a pulse applied via input SE, to the state where F=1 and $\overline{F}$=0, and reset by a pulse applied via reset input RE, to the state where F=0 and $\overline{F}$=1. Output F is also connected to one input of an AND gate 24 and output $\overline{F}$ is connected to an input of an AND gate 25. The output line for location 3 of counter logic 12*b* is connected to the negated input of an ANDNOT gate 26 and the output line for location 0 of the counter logic is connected to the negated input of an ANDNOT gate 27.

Assuming that switches K1 and K2 are closed, as shown, i.e., the device is set for automatic repetition, the circuit operates as follows. The transmission of a word block is requested by a pulse at terminal ST in that this pulse is transmitted as a request pulse via output U to the receiver. This pulse is also fed to the counter input ZE of counter 12 and sets the counter to 1, i.e., a signal appears at, and only at, the output of counter logic location 1, which output is also activated in the arrangement of FIG. 1. Furthermore, said pulse reaches the reset input RE of flipflop FF.

If during the transmission of a block a signal parity error is detected in the arriving signal by the testing device 8, as was described with reference to FIG. 1, it produces a signal having a value of 1, which signal is delivered to, in addition to the connected elements shown in FIG. 1, the setting input SE of flipflop FF, via an OR gate 28 and the ANDNOT gate 26, and sets the flipflop, i.e., to the F = 1 state. A signal having a value of 1 from the comparison circuit 21, testing the block parity, which value indicates a parity error, also reaches, via OR gate 28 and ANDNOT gate 26, the setting input SE and sets flipflop FF if this has not already been done because of a previous parity error.

The block end pulse BE which then appears reaches the second input of the AND gate 25 as well as, via switch K2, the second input of AND gate 24. If flipflop FF is not set, i.e., if F = 0 because neither a word parity error, indicated by device 8 nor a block length parity error indicated by device 21, has been detected, pulse BE remains ineffective at the AND gate 24, since the output of the latter is blocked by F = 0. However, it does produce a pulse at the output of AND gate 25, which is enabled by $\overline{F}$ = 1, and this output pulse is fed to the erase input LE of counter 12*a* and resets counter 12*a* and logic 12*b* to 0. After a further short delay produced by delay member 29, the pulse BE reaches the second input of gate 27, but does not trigger a gate output because gate 27 is blocked by the application of the logic value 1 to its negated input and produced due to the fact that logic 12*b* is in its 0 state and is therefore producing a signal having a value of 1 at its 0 location output.

The system is then again in its rest, or ready, state and does not initiate any renewed transmission of the received block because when both parity tests do not indicate any errors, the probability that a transmission error has nevertheless occurred is extremely small. For example, with an average block length of 200 words and an individual word error probability of $0.8 \cdot 10^{-3}$ the probability of the detection of an error by the double parity check rises to more than 99.85 percent.

If however, the flipflop FF is set, i.e., F = 1, during reception of a block, the pulse BE appearing at the output of member 23 remains ineffective at AND gate 25, which is blocked by $\overline{F}$ = 0, but produces a pulse at the output of AND gate 24, which is enabled by F = 1, and this latter output pulse is fed to the counter input ZE of counter 12 and sets the counter 12 to 2, i.e., a signal appears only at the output of location 2 of logic 12*b*. The pulse traveling through member 29 now produces an output pulse at gate 27, since this gate is activated due to the presence of a zero value signal at the output of the zero location of the logic 12*b*. The output pulse from gate 27 becomes effective at the reset input RE and resets flipflop FF to $\overline{F}$ = 1. It also reaches output U as a transmission request signal. In order to indicate that the transmission is to be a repeat of the already transmitted block, an identifying bit which is derived, for example, from the logic value 1 of counter logic output 2, and for the next repeat from counter logic output 3, is transmitted along with the block during such second and third transmissions.

During the second transmission of the block, with an output value of 1 appearing at the output of counter location 2, the processes already described with reference to FIG. 1 take place, particularly the comparison of the currently transmitted words with those received during the first transmission, and the device of FIG. 2 again acts in the manner described for the first transmission, i.e., when both parity testing devices 8 and 21 indicate parity, the block end pulse BE resets counter 12 to 0 and thus prevents the initiation of a renewed transmission of the block. However, if a parity error of one type or the other has been detected during the second transmission, pulse BE reaches counter input ZE and sets counter 12 to produce a signal having a value of 1 at its output 3, and, via gate 27, it effects resetting of flipflop FF to $\overline{F} = 1$ as well as a renewed transmission request via output U.

During the third transmission the processes described with reference to FIG. 1 for an output signal at location 3 of counter 12 take place. However, an error signal from the signal parity testing device 8 will not be effective in the device of FIG. 2, nor will an error signal from block parity testing device 21, since the logic signal value 1 at the output of location 3 of counter logic 12*b* blocks gate 26. The flipflop FF can thus not be set during the third transmission of the same block with the result that the block end pulse BE will in any case reset counter 12 to its 0 state so that no further transmission request takes place and the device of FIG. 2 is again in its rest state.

When switches K1 and K2 are open, the block end pulse BE from a block transmitted due to a starting pulse at terminal ST cannot cause counter 12 to count to 2 or 3 and no repetition request signal and reset signal for flipflop FF can be effected via gate 27, but pulse BE does set counter 12 back to its 0 state when no parity error was detected in the received block. If a parity error has been found and thus flipflop FF has been set to F = 1, the error indicator lamp L, which responds only for a brief moment during automatic operation, now lights continuously and indicates the presence of an error to an operator. The operator can then request a second or third transmission by applying a starting pulse at terminal ST, which also resets flipflop FF to $\overline{F} = 1$ and thus extinguishes lamp L and causes counter 12 to count up, so that the procedures take place which are intended for the respective transmission which again includes that during a third transmission flipflop FF can not be set and thus lamp L can not light up so that counter 12 is reset to its 0 state in any case by the block end pulse of the block received for the third time.

The use of the above method is of particular advantage, with displays as already mentioned. It may also serve to control, from the location of the display, data stored in the computer in that such data is read three times out of the computer for this purpose. However, the correction method can also be used with a computer as receiver or with any other type of receiver in which a signal memory is available.

It will be understood that the above description of the present invention is susceptible to various modifications, changes and adaptations, and the same are intended to be comprehended within the meaning and range of equivalents of the appended claims.

I claim:

1. A method for evaluating data words transmitted several times from a transmitter to a receiver for the purposes of error correction or at least detection, comprising, at the receiver, the steps of: transmitting a given word several times; subjecting the data word received during a first transmission to a parity test; storing such word; identifying a word having a parity error; subjecting such word received during a second transmission to a parity test; comparing the word received during the first transmission with the word received during the second transmission, replacing the stored word from the first transmission with the word received during the second transmission whenever the word received during the second transmission has proper parity; producing a difference indication when the word received during the first transmission differs from that received during the second transmission; and replacing the stored word with the word received during a third transmission only when such a difference indication is produced and when the word received during the third transmission has proper parity.

2. A method as defined in claim 1 wherein said step of identifying produces an identifying signal different from the signal representing the difference indication.

3. A method as defined in claim 1 for evaluating a block of data words transmitted with a block parity signal, further comprising selectively preventing at least one of the second and third transmissions on the basis of the results of the parity tests performed.

4. Apparatus for evaluating data words transmitted several times together with a parity test signal from a transmitter to a receiver for purposes of error correction or at least detection, comprising, in combination, at the receiver: memory means for storing the data words and associated identifying signals; a first register connected for holding a word received during a transmission together with its associated received parity test signal; parity test means connected for subjecting the data word in said first register to a parity test and producing a parity error signal when a word contains a parity error; transfer gate means connected for transferring a received word, without its parity test signal, from said first register to a selected location in said memory means; identity testing means connected to compare a word in said first register with the corresponding word received during a previous transmission and stored at the selected memory means location, for producing a difference indication when the compared words differ; a transmission counter connected for producing a count signal identifying the number of times a word has been transmitted; and logic circuit means connected to said transfer gate means, said transmission counter and said parity test means for causing said difference indication to be introduced into the selected memory means location upon the production by said transmission counter of a count signal indicating completion of a predetermined number of transmissions and for enabling said gate means in dependence on the relation between the count signal, the output produced by said parity test means and the value of the indication in said selected memory means location.

5. An arrangement as defined in claim 4 wherein said transfer gate means are further connected for placing a signal representing the output of said parity test means into the selected location of said memory means.

6. An arrangement as defined in claim 4 wherein said logic circuit causes a word stored at a location of said memory means after the first transmission to be replaced by the corresponding word received during the second transmission only when that word received during the second transmission does not produce a parity error signal, and causes a word stored at a location of said memory means after the second transmission to be replaced by the corresponding word received during the third transmission only when the comparison of the stored word produced a difference signal in said identity testing means and that word received during the third transmission does not produce a parity error signal.

7. An arrangement as defined in claim 6 for evaluating blocks of data words transmitted with a block parity test signal, further comprising: block parity test means connected for subjecting each received block to a parity test and for producing an output representing the result of that test; and means connected to said parity test means and said block parity test means for indicating the occurrence of a word parity error or a block parity error to control the initiation of a second or third transmission only when at least one of these evaluation signals indicates the presence of an error.

8. A method for evaluating data words transmitted several times from a transmitter to a receiver for the purposes of error correction or at least detection in a system including an image memory connected to a display at the receiver, comprising, at the receiver, the steps of: transmitting a given word several times; subjecting the data word received during a first transmission to a parity test; storing such word; identifying a word having a parity error; subjecting such word received during a second transmission to a parity test; comparing the word received during the first transmission with the word received during the second transmission, replacing the stored word from the first transmission with the word received during the second transmission whenever the word received during the second transmission has proper parity; producing a difference indication when the word received during the first transmission differs from that received during the second transmission, said step of identifying producing an identifying signal different from the signal representing the difference indication; placing a stored word received during the first transmission with a parity error on the display in the form of a special error symbol; and providing a stored word received during the second transmission and differing from the word received during the first transmission with a special identifying bit which effects a display of the signal which differs visibly from the display produced when there is no such difference.

* * * * *